United States Patent [19]

Harvey et al.

[11] Patent Number: 4,966,807

[45] Date of Patent: Oct. 30, 1990

[54] MULTIAXIALLY ORIENTED THERMOTROPIC POLYMER FILMS AND METHOD OF PREPARATION

[75] Inventors: Andrew C. Harvey, Waltham; Richard W. Lusignea, Brighton; James L. Racich, Framingham, all of Mass.

[73] Assignee: Foster Miller, Inc., Waltham, Mass.

[21] Appl. No.: 206,484

[22] Filed: Jun. 13, 1988

[51] Int. Cl.$^5$ .............................................. B32B 9/00

[52] U.S. Cl. .................................. 428/220; 424/394; 424/409; 424/473.5; 156/244.14; 264/85; 264/564

[58] Field of Search .................. 264/85, 95, 364; 156/244.14; 428/394, 309, 220, 473.5; 528/193, 313; 524/417; 252/299.1

[56] References Cited

U.S. PATENT DOCUMENTS

| | | | |
|---|---|---|---|
| 3,595,736 | 7/1971 | Buteux | 428/426 |
| 3,598,637 | 8/1971 | Stoll et al. | 428/209 |
| 3,681,297 | 8/1972 | D'Allelio | 528/193 |
| 4,011,128 | 3/1977 | Suzuki | 156/500 |
| 4,039,610 | 8/1977 | Johnson et al. | 264/237 |
| 4,041,206 | 8/1977 | Tsunashima et al. | 428/409 |
| 4,051,108 | 9/1977 | Helminiak et al. | 428/426 |
| 4,085,175 | 4/1978 | Keuchel | 264/51 |
| 4,332,759 | 6/1982 | Ide | 264/108 |
| 4,333,907 | 6/1982 | Urasaki et al. | |
| 4,353,954 | 10/1982 | Yamaoka et al. | 428/216 |
| 4,358,330 | 11/1982 | Aronovici | 156/244.14 |
| 4,370,293 | 1/1983 | Petersen-Hoj | 264/514 |
| 4,377,546 | 3/1983 | Helminiak et al. | 264/232 |
| 4,487,735 | 10/1984 | Chenevey et al. | 264/85 |
| 4,533,692 | 8/1985 | Wolfe et al. | 524/417 |
| 4,533,693 | 8/1985 | Wolfe et al. | 524/417 |
| 4,533,724 | 8/1985 | Wolfe et al. | 528/313 |
| 4,536,365 | 8/1985 | Zwick | 264/588 |
| 4,547,416 | 10/1985 | Reed et al. | 215/1 C |
| 4,554,119 | 11/1985 | Chenevey | 264/85 |
| 4,600,765 | 7/1986 | Lee et al. | 528/193 |
| 4,614,629 | 9/1986 | Economy et al. | |
| 4,659,408 | 4/1987 | Redding | 156/244.17 |
| 4,668,760 | 5/1987 | Boudreaus, Jr. et al. | 528/193 |
| 4,699,821 | 10/1987 | Hallock | 428/192 |
| 4,721,637 | 1/1988 | Suzuki et al. | 428/394 |
| 4,772,089 | 9/1988 | Ide et al. | |
| 4,774,632 | 9/1988 | Neugebauer | 361/386 |
| 4,778,244 | 10/1988 | Ryan | 350/96.23 |
| 4,786,348 | 11/1988 | Luise | |

FOREIGN PATENT DOCUMENTS 51-16363 of 1976 Japan .................................. 264/559
60-79130 2/1976 Japan .

OTHER PUBLICATIONS

Journal Thermal Analysis, vol. 8 (1975) 547-555, Porter et al.
PCB Loading, Dance, Electronic Production, Jun. 1982, 42-48.
Thermal Analyses of Chip Carrier Compatible Substrates, Amick et al., pp. 34-39.
Advanced Substrates for PCBs, Guiles, pp. 77-80, SAMPE, Feb. 1985.
Kevlar Epoxy Substrate SAMPE Journal, Jan./Feb. 1984, Packard, pp. 6-14.
Tailorable CTR Multilayer PWB, Rodini Jr., Apr. 15, 1986.
Tailorable CTE Multilayer PWB, Zakrayaek, Apr.-Aug. 1915.
Tailorable CTE Multilayer PWB, Pillar, 4-15-86.
Tailorable CTE Multilayer PWB, Belke, Jr., 3/86.
English, Lawrence K., "Liquid-Crystal Polymers: in a Class of Their Own", ME, Mar. 1986, pp. 36-41.
Wood, A. Stuart, "Why the Buildup in Supply of Liquid Crystal Polymers?", Modern Plastics, Nov. 1987, pp. 99-103.
Presentation by Charles E. McChesney of Hoechst Celanese, on Jun. 5, 1988.

Primary Examiner—Patrick Ryan
Attorney, Agent, or Firm—David G. Conlin; Ernest V. Linek; Linda M. Buckley

[57] ABSTRACT

This invention relates in general to the formation of multiaxially (e.g., biaxially) oriented films from high molecular weight liquid crystalline thermotropic polymers (homopolymers, copolymers, and the like), wherein due to the processing conditions employed, the films have a controlled molecular orientation. The novel multiaxially oriented films of the present invention are preferably prepared from two commercially available thermotropic polymers, Datrco Manufacturing, Incorporated's XYDAR ® LCP and Hoechst Celanese's VECTRA ® LCP.

14 Claims, 1 Drawing Sheet

```
┌─────────────────────────────────────────┐
│   CONDITIONING OF POLYMER RESINS        │──10
└─────────────────────────────────────────┘
                    │
                    ▼
┌─────────────────────────────────────────┐
│      MULTIAXIAL ORIENTATION             │──12
└─────────────────────────────────────────┘
                    │
                    ▼
┌─────────────────────────────────────────┐
│       POST FILM TREATMENT               │
│       COOLING, DRYING, ETC.             │──14
└─────────────────────────────────────────┘
```

MULTIAXIALLY ORIENTED THERMOTROPIC POLYMER FILMS AND METHOD OF PREPARATION

STATEMENT OF GOVERNMENT INTEREST

Funding for the present invention was obtained from the Government of the United States by virtue of Contract Nos. F33615-83-C-5120 and N00164-87-C-0050, from the Departments of the Air Force and the Navy, respectively. Thus, the Government of the United States has certain rights in and to the invention claimed herein.

FIELD OF THE INVENTION

This invention relates in general to the formation of multiaxially (e.g. biaxially) oriented films from high molecular weight liquid crystalline thermotropic polymers (homopolymers, copolymers, and the like), especially those commercially available thermotropic polymers sold under the, tradenames of Xydar® LCP, Dartco Manufacturing Inc. and Vectra® LCP, Hoechst Celanese. Thermotropic polymers are provided with a controlled molecular orientation (e.g., cross ply, by virtue of high temperature processing conditions which impart at least two different orientation directions to the polymer film.

BACKGROUND OF THE INVENTION

Film processing methods and apparatus have been available for a number of years. However, it is not believed that the methods previously utilized for standard polymeric films, can readily be employed in the formation of thermotropic polymer films, especially films having the unique characteristics of those prepared herein.

For example, U.S. Pat. No. 4,370,293 to Petersen-Hoj describes a method and apparatus for the manufacture of biaxially oriented plastic films, particularly polyester films. The process described for polyester comprises extruding polyester through an annular die to form a seamless tube and inflating the tube by means of a pressurized gas. The expanded tube thus formed is drawn out in a longitudinal direction, cooled and flattened. The flattened tube is heated to the orientation temperature of the film, expanded again, and stretched in its longitudinal direction. These stretching techniques are said to impart a biaxial orientation to the polymeric backbone of the film.

Similarly, U.S. Pat. No. 4,011,128 to Suzuki describes a method and apparatus for forming a cross-oriented film, wherein a non-oriented film to be treated is first formed by conventional methods, then cross-oriented by stretching and twisting. In addition the cross-oriented film is flattened so as to continuously form a laminated cross-oriented film.

U.S. Pat. No. 4,358,330 to Aronovici describes a method and apparatus for manufacturing films having pairs of adjacent layers whose molecular orientation is in different directions. The method employed is a modification of the conventional "blown film" technique such that the molecular chains forming the layers of film are oriented substantially immediately prior to their solidifying.

U.S. Pat. No. 4,496,413 to Sharps, Jr., describes a process and apparatus for the preparation of a blocked cross-plied polymer film which involves the extrusion of a polymer melt through a tubular rotary die. The rotation of a single member of the die is said to impart a molecular orientation to the polymer in a transverse direction during the extrusion. The film is blocked by expanding the film and then pressing opposing walls together to produce a composite film having at least two layers, each having a transverse molecular orientation opposing the other. The composite film is said to have a balanced cross-ply.

The disclosures of each of the above described patents are incorporated herein by reference.

SUMMARY OF THE INVENTION

The present invention is directed to the production of films having heretofore unavailable strength characteristics in more than one direction, i.e., films having a multiaxial orientation, and preferably a high degree of biaxial orientation.

In some preferred embodiments of the present invention, thick films, i.e., films having a thickness greater than or equal to about 0.10 mm, preferably greater than or equal to about 0.20 mm, are formed and used. In other preferred embodiments, thin films, i.e., films having a thickness of less than or equal to about 0.010 mm, preferably less than or equal to about 0.05 mm, are formed.

The starting materials useful herein include those thermotropic polymeric materials in which strain produces a material orientation in the microscale structure and which are relatively weak if this orientation is in only one direction, i.e., uniaxial.

The method of the present invention comprises producing an initial microscale structural orientation within a polymer by a sequence of straining methods, followed by solidifying this orientation by a sequence of thermal and/or chemical conditioning operations.

The films of the present invention have a multiaxial orientation, preferably balanced biaxial. They also exhibit a controllable coefficient of thermal expansion (CTE), low dielectric constant, low moisture pickup characteristics, low outgassing, high tensile strength, high modulus, and superior environmental resistance characteristics in comparison to uniaxial films of similar composition. The films of the present invention also exhibit excellent thermal stability, chemical resistance and toughness, even at low temperatures.

The following definitions of multiaxially oriented film strength characteristics will be important in understanding the present invention:

| | |
|---|---|
| balanced biaxial | a film having maximum strength and stiffness at approx. ± 45 deg. of the machine direction, but exhibiting the least angular dependence of these properties. |
| predominantly uniaxial | a film having maximum strength and stiffness in the machine direction, but also with some strength within ± 20 deg. of the machine direction. |
| nearly uniaxial | a film having maximum strength and stiffness in the machine direction, with some strength within only ± 5 deg. of the machine direction. |

As used herein, the generic term for those orientations not meeting specific definitions above, but providing strength to a film in both the machine and transverse directions is "multiaxial."

The present invention is also directed to methods and apparatus suitable for producing multiaxially oriented films, coatings, and like materials from thermotropic liquid crystalline polymers.

DETAILED DESCRIPTION OF THE PREFERRED EMBODIMENTS

Figure 1:
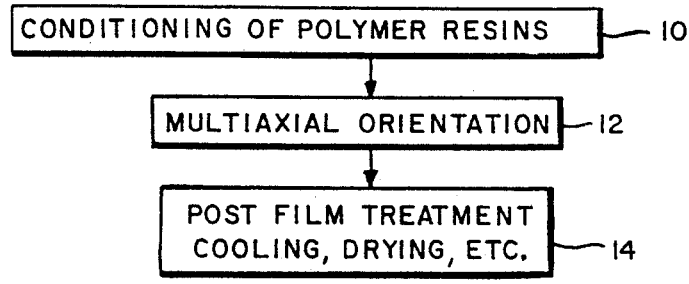
FIG. 1 is a block diagram depicting the process of the present invention for the formation of multiaxially oriented films from thermotropic liquid crystalline polymers.

Referring to FIG. 1, there is illustrated a block diagram of the principal steps of the method of the present invention for the formation of multiaxially oriented films from the preferred thermotropic liquid crystalline polymers, of the present invention, namely Xydar ® LCP and Vectra ® LCP.

As illustrated at 10 the first processing step comprises the conditioning of the polymer resins, which are available from their respective manufacturers in the form of solid pellets or powders. The polymer resin is fed to a heated storage tank in which it melts. This "melt" is then extruded through a heated pump block to the next phase of the process.

The second process step 12 comprises the multiaxial orientation step. This may be accomplished by the use of any extrusion means which induce shear flow, stretching, and the like. Preferred extrusion means of the present invention include counter rotating tube dies, plates, or roller dies. It has been discovered that such preferred extrusion means, preferably combined with subsequent stretching of the extrudate, may be employed to impart varying degrees of biaxial orientation to ordered polymers.

A third process step 14 is generally a drying and cooling treatment step.

Figure 2:
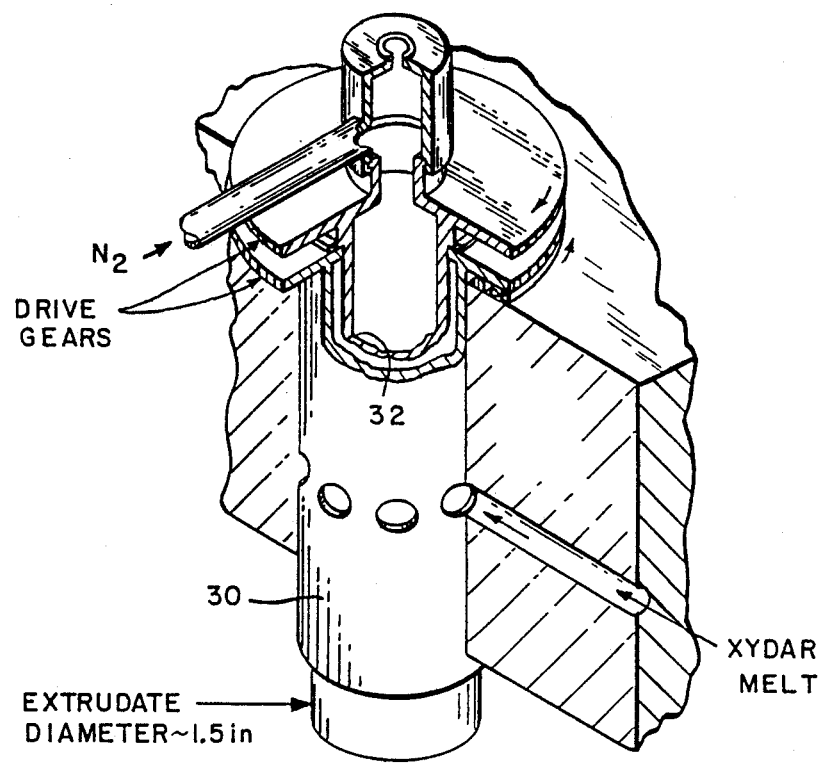
FIG. 2 is an illustration of the preferred counter-rotating tube die apparatus for producing a multiaxially oriented film from thermotropic liquid crystalline polymers.

FIG. 2 illustrates the preferred counter-rotating die 28 used to impart a multiaxial orientation to the polymer melt flowing therethrough. The basic structure of the die comprises two counter rotating barrels, 30 and 32 respectively, whose purpose is to create a shear field through the cross section of the polymer melt.

This shear field is at right angles to the axial shear field produced by forcing the melt axially through the annulus of the die. Counter-rotating die members are necessary to prevent a screw-like rotation of the orientation and twist-off of the extrudate which occurs if only one member of the die is rotated. This combination of shear fields is necessary prior to any blowing operation in order to permit blowing of the tube without fracturing the extrudate, and hence, to produce material with integral multiaxial film properties.

The processing equipment of the present invention is straight forward in design and fabrication. The storage tank must be heated, is preferably made of stainless steel (e.q., type 316L), and is pressurized with dry/inert gas (e.q.. $N_2$) in order to prevent both contamination of the melt and/or starvation of the pump. The extruder is a conventional injection-molding type. The pump is typically a split-block type. Other types of pump, such as piston-ram, extruder, or traveling-cavity (Moyno), are possible.

While other counter-rotating tube dies exist, the design of the die of the present invention is specialized in that a wide range of parameters can be explored by using different speeds and die-inserts. Sealing between the hot block and die cylinders is affected by spring loaded face-bushing (Teflon ® or graphite), and alignment is maintained by remote collar bearings. Because the extrudate undergoes so much densification to final thickness, the die annulus is usually large, moderating die pressure required The central gas for film blowing ($N_2$) is provided through a remote, cooler, standard rotating coupling.

Table I summarizes specific critical features of the counter-rotating die assembly used herein for processing Xydar ® LCP polymer melts.

TABLE I

| DIE CONSTRUCTION | |
|---|---|
| Feature | Xydar Die |
| Operating temperature | 800° F. |
| Feed holes | 48 × 1/16 in. |
| Extruded tube diameter | 1¼ in. |
| Temperature control zones | 3 |
| Shear zone gap | 0.080 in. |
| length | 4 in. |
| Exit gap | 0.030 in. |
| Full flow pressure drop | 4,000 psi |

In order to obtain better control of the, tubular extrusion process of Xydar ® LCP an Vectra ®, LCP an air ring system, converging rack, and nip roll unit were assembled downstream of the extrusion die.

This equipment allows more precise draw and orientation control for the blown film. The air ring permits controlled rapid cooling of the hot film, while the nip unit allows controlled extensional draw and positive bubble closure, and the converging rack minimizes potential wrinkling of the flattened bubble during nipping.

The preferred die also incorporates three separate temperature control zones. The center zone, where the polymer melt is introduced, was designed to operate at high temperatures (e.q., 750° to 850° F.). The exit zone has the capability of control at lower temperatures, so as to effect greater orientation through rotational and longitudinal shear. Finally, the upper end of the die, which contains the alignment bearings, operates below about 250° F., so as to maintain proper functioning of the bearings.

Other features of the die used in the present invention are reviewed in Table II.

TABLE II

| XYDAR DIE CONSTRUCTION | |
|---|---|
| Feature | Xydar Die |
| Bore diameter | 1 in. |
| Able to handle standard ⅛ in. pellet feed | Yes |
| L/D | 24 |
| Barrel | Xaloy plated steel |
| Screw | Chrome plated steel |
| Maximum barrel pressure | 10,000 psi |
| Maximum resin throughput | 60 cc/min |
| Maximum operating temperature | ≧800° F. |
| Metering pump | 950° F. |

TABLE II-continued

| XYDAR DIE CONSTRUCTION | |
| --- | --- |
| Feature | Xydar Die |
| maximum operating temperature | |
| Material | D2 tool steel |
| cc/rev | 0.6 |

Equipment was fabricated to supply the starved-feed condition recommended by Dartco for the SRT-300 Xydar ® LCP resin. A simple auger feed apparatus was assembled.

Resin was fed into the preheated empty extruder and die, and film was extruded. Operating conditions are summarized in Table III.

The resin was fed manually into the entry port simulating starved feed conditions. Preliminary calculations predicted that high melt pressures would be experienced in the die. To minimize these pressures the die temperature controller was set initially to 800° F., with the intention of reducing this temperature after extrusion reached steady state. This reduced the possibilities of pressure surges and equipment damage.

TABLE III

| OPERATING CONDITIONS OF XYDAR EXTRUSION | |
| --- | --- |
| Temperature | |
| Barrel | 800° F. |
| Melt | 742° F. |
| Die Zone 1 | $\geq 160°$ F. |
| 2 | 800° F. |
| 3 | 800° F. |
| Resin throughput | 7.7 cc/min |
| Draw | 5 max |
| blowout | 2 max |
| Counter-rotational mandrel rpm | 2.4 |
| Counter-rotational shear | 4.7 sec$^{-1}$ |
| Film Made | |
| Minimum blow and draw: | 1¼ in. diameter 15 mil thick |
| Maximum blow and draw: | 2¼ in. diameter 5½ mil thick |

The function and operation of the multiaxial orientation process and equipment of the present invention are thus simple and straightforward:

The counter-rotation of the dies generates transverse shear without any net twist or torque on the extruded tube.

The pump generates the axial flow and, in combination with the annular gap, determines the axial shear (flow profile).

Draw-down of the tube at a linear rate greater than die discharge causes an axial strain in the hot extrudate.

Blowing of the film tube causes circumferential stress and strain in the extrudate.

In addition to the processing conditions described above, the present invention is directed to multiaxially, preferably biaxially, oriented films, coatings, and like materials, formed from thermotropic liquid crystalline polymers.

Two especially preferred thermotropic liquid crystalline polymers from which multiaxially oriented films can be prepared are Dartco Manufacturing Company's Xydar ® LCP and Celanese's Vectra ® LCP polymers.

The chemical structures of these two polymers are as follows:

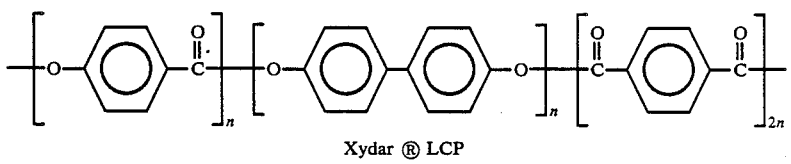

Xydar ® LCP

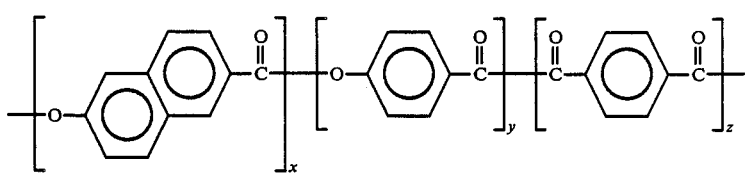

Vectra ® LCP

The present invention is thus directed to the production of thermotropic liquid crystalline polymer films that have highly controlled orientation resulting in films that have property balances that are much more useful from a practical standpoint than ordinary uniaxially (or randomly) oriented thermotropic liquid crystalline polymer films, and to the films per se.

The essential strength characteristics of the films of the present invention are the result of a two stage orientation process followed by post treatment to optimize the film property balance.

Films produced according to the present invention have high tensile values in the machine direction and substantial strength in the transverse direction. These films maintain their film integrity in two directions, and as a result are useful in many applications requiring good film properties. The coefficient of thermal expansion can be controlled by the direction and extent of orientation in the film.

The applications thus far identified for thermotropic liquid crystalline polymer films are numerous, including structural, aerospace, electronic, optical, ballistic protection and communications applications. For example, the process of the present invention affords films that have strength characteristics making them suitable for the production of laminate film composites and like structures.

As set forth supra, the preferred thermotropic liquid crystalline polymers used as starting materials in the present invention are Xydar ® LCP and Vectra ® LCP.

Xydar® LCP is the tradename of Dartco's high temperature thermotropic resin. Vectra® LCP is Celanese's trademark for their range of plastic resins exhibiting performance characteristics similar to those of Xydar® LCP.

Xydar® LCP has the highest temperature resistance of all commercially available liquid crystalline polymers. Because Xydar® LCP is a thermotropic polymer, the film can be molded at high temperature. This allows Xydar® LCP to be employed in a vast array of applications not available to other liquid crystalline polymers, e.q. in the automotive industry for sheet molded parts.

Xydar® LPC resin melts at about 800° F., and is the highest strength unfilled thermotropic liquid crystalline polymer commercially available. The melt characteristics of this resin are generally tailored for injection molding, i.e., low pressure and easy flow when pumped through narrow cavities (high shear conditions).

Extruded Xydar® LCP film was golden in color (similar to that of the resin pellets), quite heavily textured on its outside surface, and much less so on the inside. The heavy texture appeared to relate to voids, especially notable in the thinnest, most highly blown areas of the tubes. While Xydar® LCP resin neither absorbs moisture readily, nor retains much moisture at equilibrium, the possibility exists that the film texture relates to moisture loss. Pre-drying of resin in a heated vacuum oven should help resolve the problem.

The voids in the film give it a nonhomogeneous appearance and result in rough surface texture. When held up to the light, the Xydar® LCP film looks like a connected network with the characteristic "fibrils" at roughly balanced angles to the machine direction.

The "mottled" nature of the Xydar® LCP film could be due to evolution of gas bubbles from moisture entrained in the Xydar® LCP. Even a small percentage of moisture can cause foaming, as in nylon extrusion. Pre-drying of the Xydar® LCP resin should check this moisture effect.

It is also likely that the Xydar® LCP melt did not flow evenly during extrusion, resulting in regions of high and low consolidation. This problem could be solved by using the "extrusion grade" material which should have better draw characteristics. Also, changes in temperature, pressure and throughput will improve properties and surface finish.

Fifteen pounds of Vectra® LCP B900 resin was procured from Celanese, dried per the manufacturer's recommendations, and successfully extruded into a film with a variety of biaxial orientations. Table IV reviews the conditions and results from extrusion.

The Vectra® LCP films exhibited much less porosity than the Xydar® LCP films, showed biaxial fibrillation and strength at the time of extrusion, and possessed an extremely smooth surface. Film thicknesses from 2 to 10 mils were readily obtained with some tubes as thick as 17 mils.

As was done with Xydar® LCP film, thermally bonded laminates were obtained, both with the uniaxial Celanese Vectra® LCP film and with the freshly prepared biaxial Vectra® LCP films. Because of the differences between the two grades of resin (the Celanese film uses A900 Vectra® LCP, while the films of the present invention used B900), temperatures and pressures were optimized for each laminate type. Copper cladding was successfully accomplished with the the biaxial film as well.

TABLE IV

VECTRA® EXTRUSION CONDITIONS and RESULTING FILM

A. Extrusion Conditions

Melt temperature - 600 to 650° F.
Melt pressure - 2,000 to 2,500 psi
Die shear - 3 to 9 sec$^{-1}$
Draw - 1 to 3
Die annulus - 1.25 in. diameter × 0.0125 in. thicknesses
Blowout - 1 to 2

B. Resulting Film

| Type of Orientation | Film Thickness | Ft of Film |
|---|---|---|
| ±20° to ±25° Predominantly Uniaxial | 2 to 7 mils | 10 |
| ±25° to ±35° Nearly Balanced Biaxial | 2 to 3 mils | 20 |
| ±10° Nearly Uniaxial | 2 to 3 mils | 10 |

Table V represent preliminary data for the above identified Vectra® LCP film samples.

TABLE V

PRELIMINARY CHARACTERISTICS OF VECTRA® FILMS

| Sample Orientation to MD | No. of Samples Tested | Tensile Strength, ksi | Tensile Mod., msi | CTE ppm/°C. |
|---|---|---|---|---|
| 0° | 5 | 103 | 2.66 | — |
| 0° | 2 | — | — | −14.4 |
| 90° | 2 | <10 | — | +31.9 |

The high tensile properties indicate that Vectra indeed offers desirable properties for electronics (e.g. printed wire board substrates, and the like) applications. However, the highly anisotropic CTE properties of the unidirectional film must be modified if isotropic x and y CTE in the 3.7 ppm/°C. range is to be achieved. This desired CTE characteristic can be tailored into the film by inducing various degrees of biaxial orientation of the molecules in the film during processing as with Xydar® LCP.

LAMINATES

Both Xydar® LCP and Vectra® LCP film laminates were prepared by hot pressing together two or more individual film sheets at a temperature ranging from about 525 to 550° C., and at a pressure ranging from about 100 to 220 psi. See Table VI.

TABLE VI

PROCESSING CONDITIONS FOR LAMINATES

| | Xydar | Vectra |
|---|---|---|
| Temperature (°C.) | 288 | 238 |
| Pressure (Psi) | 250 | 100 |
| Time (min.) | 2.0 | 1.0 |
| Laminate Thickness (mils) | 4 to 5 | 4 to 5 |
| No. of Plies | 2 | 2 |
| Film Orientation | ±10° | ±10° |
| Film Thickness (mils) | 2 to 3 | 2 to 3 |

Note:
Preheat mold to 260° C. when forming Xydar
Preheat mold to 220° C. when forming Vectra
Cool mold quickly to 100° C.

In addition, copper was bonded to these laminates using this same hot pressing technique, at the same temperatures and pressures described above. Table VII shows the processing conditions for samples made with Xydar and copper foil.

TABLE VII

| Xydar Film and Copper Foil Laminating Conditions | |
| --- | --- |
| Temperature | 500° C. |
| Pressure | 100 psi |
| Time | 120 seconds |
| Sample size | 4 in. × 4 in. |
| # of plies | 4 Xydar in center, 2 copper on upper and lower foil |
| Total laminate thickness | 0.015 in. |

The present invention has been described in detail including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A film having a controllable coefficient of thermal expansion and a thickness of at least about 0.010 mm, prepared from a molecularly ordered thermotopic liquid crystalline polymer, said film having a multiaxial molecular orientation.

2. The film of claim 1, wherein the thickness is at least about 0.10 mm.

3. The film of claim 2, wherein the multiaxial molecular orientation is nearly balanced biaxial.

4. The film of claim 1, 2, or 3, wherein the liquid crystalline polymer is selected from the group of Xydar ® LCP and Vectra ® LCP.

5. A film having a controllable coefficient of thermal expansion and a thickness of less than about 0.10 mm, prepared from a molecular ordered thermotropic liquid crystalline polymer, said film having a multiaxial molecular orientation.

6. The film of claim 4, wherein the multiaxial molecular orientation is nearly balanced biaxial.

7. The film of claim 5 or 6, wherein the liquid crystalline polymer is selected from the group of Xydar ® LCP and Vectra ® LCP.

8. A method of preparing a multiaxially oriented film from a thermotropic liquid crystalline polymer film comprising the steps of:
   (a) subjecting a polymer melt of said polymer to at least two cross-directional strain forces; and
   (b) solidifying the microscale structural orientation formed in step (a) by physical, chemical or thermal means.

9. The method of claim 8, wherein the multiaxial orientation is nearly balanced biaxial.

10. The method of claim 8 or 9, wherein the thermotropic polymer has the formula:

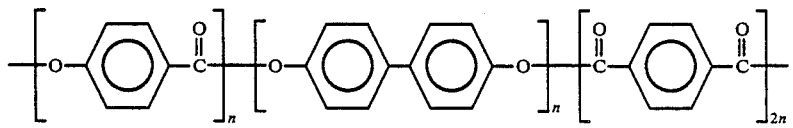

11. The method of claim 8 or 9, wherein the thermotropic polymer has the formula:

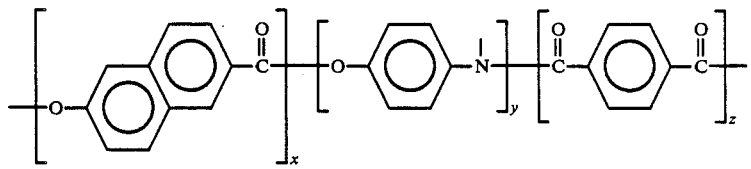

12. A laminated composite film comprising at least two multiaxially oriented films prepared from a molecularly oriented thermotropic liquid crystalline polymer.

13. The laminated composite film of claim 12, wherein the thermotropic liquid crystalline polymer is selected from the group consisting of Xydar ® LCP, ectra ® LCP, and mixtures thereof.

14. The laminated composite film of claim 12 or 13, which further comprises a layer of copper thereon or therebetween.

* * * * *